US009535519B1

(12) United States Patent
Raffles et al.

(10) Patent No.: US 9,535,519 B1
(45) Date of Patent: Jan. 3, 2017

(54) SMART HOUSING FOR EXTENDING TRACKPAD SENSING

(71) Applicant: Google Inc., Mountain View, CA (US)

(72) Inventors: Hayes Solos Raffles, Mountain View, CA (US); Russell Norman Mirov, Mountain View, CA (US)

(73) Assignee: Google Inc., Mountain View, CA (US)

( * ) Notice: Subject to any disclaimer, the term of this patent is extended or adjusted under 35 U.S.C. 154(b) by 266 days.

(21) Appl. No.: 13/918,367

(22) Filed: Jun. 14, 2013

(51) Int. Cl.
*G06F 3/041* (2006.01)

(52) U.S. Cl.
CPC ...................... *G06F 3/041* (2013.01)

(58) Field of Classification Search
CPC .................. G02B 27/01; G02B 27/017; G02B 2027/0178; G02B 2027/014; G06F 3/0412; G06F 2203/04104; G06F 1/1626; G06F 3/0416; G06F 3/044; G06F 1/1684; G06F 3/04886
USPC ............ 345/7–9, 173–179; 178/18.01–18.09
See application file for complete search history.

(56) References Cited

U.S. PATENT DOCUMENTS

| 8,345,013 | B2 | 1/2013 | Heubel et al. | |
|---|---|---|---|---|
| 8,432,368 | B2 | 4/2013 | Momeyer et al. | |
| 2007/0182719 | A1* | 8/2007 | Lee et al. | 345/173 |
| 2008/0042992 | A1* | 2/2008 | Kim | G06F 3/0416 345/173 |
| 2008/0297435 | A1* | 12/2008 | Santos et al. | 345/8 |
| 2009/0109191 | A1* | 4/2009 | Felder et al. | 345/174 |
| 2010/0039375 | A1* | 2/2010 | Huang et al. | 345/156 |
| 2010/0079389 | A1* | 4/2010 | Liu et al. | 345/173 |
| 2010/0127995 | A1* | 5/2010 | Rigazio | G06F 3/04886 345/173 |
| 2010/0137027 | A1* | 6/2010 | Kim | 455/556.1 |
| 2010/0182276 | A1* | 7/2010 | Tanabe et al. | 345/174 |
| 2010/0188363 | A1* | 7/2010 | Ikeda | G06F 3/044 345/174 |
| 2010/0283742 | A1* | 11/2010 | Lam | G06F 3/04883 345/173 |

(Continued)

FOREIGN PATENT DOCUMENTS

WO    WO 2008062217 A2 *   5/2008   ............ B60K 35/00

OTHER PUBLICATIONS

Unpublished U.S. Appl. No. 13/178,740 entitled "Optical Frame for Glasses and the Like with Built-In Camera and Special Actuator Feature".

*Primary Examiner* — Amare Mengistu
*Assistant Examiner* — Stacy Khoo
(74) *Attorney, Agent, or Firm* — McDonnell Boehnen Hulbert & Berghoff LLP

(57) ABSTRACT

Embodiments described herein may help to provide an extension of touchpad sensing to adjacent surfaces. An example device may involve: (a) a touchpad having a first surface, (b) at least one electrode coupled to at least one location on the first surface, where at least a portion of the at least one electrode is arranged on a second surface that is adjacent to the first surface so that a touch to the portion of one of the electrodes on the second surface causes the touchpad to output data relating to the corresponding location on the first surface, and (c) and a control system configured to: (1) receive a first signal that is indicative of touch input on the touchpad, and (2) detect, in the first signal, data relating to the corresponding location on the first surface and responsively output a second signal relating to a touch of one of the electrodes on the second surface.

18 Claims, 14 Drawing Sheets

(56) References Cited

U.S. PATENT DOCUMENTS

| | | | |
|---|---|---|---|
| 2011/0038114 A1* | 2/2011 | Pance | G06F 1/1616 |
| | | | 361/679.4 |
| 2011/0084929 A1* | 4/2011 | Chang et al. | 345/173 |
| 2011/0113362 A1* | 5/2011 | Kato | G06F 3/03547 |
| | | | 715/784 |
| 2011/0260741 A1* | 10/2011 | Weaver | G06F 3/0418 |
| | | | 324/686 |
| 2011/0310459 A1* | 12/2011 | Gates | G06F 3/0412 |
| | | | 359/296 |
| 2012/0075238 A1* | 3/2012 | Minami | G06F 3/044 |
| | | | 345/174 |
| 2012/0327016 A1 | 12/2012 | Hristov | |
| 2013/0044042 A1* | 2/2013 | Olsson et al. | 345/8 |

* cited by examiner

SMART HOUSING FOR EXTENDING TRACKPAD SENSING

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a graphic display close enough to a wearer's (or user's) eye(s) such that the displayed image appears as a normal-sized image, such as might be displayed on a traditional image display device. The relevant technology may be referred to as "near-eye displays."

Wearable computing devices with near-eye displays may also be referred to as "head-mountable displays" (HMDs), "head-mounted displays," "head-mounted devices," or "head-mountable devices." A head-mountable display places a graphic display or displays close to one or both eyes of a wearer. To generate the images on a display, a computer processing system may be used. Such displays may occupy a wearer's entire field of view, or only occupy part of a wearer's field of view. Further, head-mounted displays may vary in size, taking a smaller form such as a glasses-style display or a larger form such as a helmet, for example.

Emerging and anticipated uses of wearable displays include applications in which users interact in real time with an augmented or virtual reality. Such applications can be mission-critical or safety-critical, such as in a public safety or aviation setting. The applications can also be recreational, such as interactive gaming. Many other applications are also possible.

SUMMARY

Example embodiments may help to extend the sensing of a touchpad to adjacent surfaces in a computing device, such as a head-mountable device (HMD). In particular, one or more electrodes may be arranged along a surface adjacent to a touchpad. Each of the one or more electrodes may be coupled to a location on the touchpad so that a touch to one of the electrodes on the adjacent surface causes the touchpad to output data relating to the corresponding location on the touchpad. A control system may then detect a signal relating to the corresponding location and output a signal relating to a touch of one of the electrodes on the second surface.

In one aspect, a device may involve: (a) a touchpad having a first surface, (b) at least one electrode coupled to at least one location on the first surface, where at least a portion of the at least one electrode is arranged on a second surface that is adjacent to the first surface so that a touch to the portion of one of the electrodes on the second surface causes the touchpad to output data relating to the corresponding location on the first surface, and (c) and a control system configured to: (1) receive a first signal that is indicative of touch input on the touchpad, and (2) detect, in the first signal, data relating to the corresponding location on the first surface and responsively output a second signal relating to a touch of one of the electrodes on the second surface.

In another aspect, a method may involve: (a) receiving a first signal at a computing device that is indicative of touch input on a touchpad having a first surface, where at least one electrode is coupled to at least one location on the first surface and where at least a portion of the at least one electrode is arranged on a second surface that is adjacent to the first surface so that a touch to the portion of one of the electrodes on the second surface causes the touchpad to output data relating to the corresponding location on the first surface, (b) detecting, in the first signal, data relating to the corresponding location on the first surface; and (c) outputting a second signal relating to a touch of one of the electrodes on the second surface.

In another aspect, a non-transitory computer readable medium has stored therein instructions executable by a computing device to cause the computing device to perform functions comprising: (a) receiving a first signal at a computing device that is indicative of touch input on a touchpad having a first surface, where at least one electrode is coupled to at least one location on the first surface and where at least a portion of the at least one electrode is arranged on a second surface that is adjacent to the first surface so that a touch to the portion of one of the electrodes on the second surface causes the touchpad to output data relating to the corresponding location on the first surface, (b) detecting, in the first signal, data relating to the corresponding location on the first surface; and (c) outputting a second signal relating to a touch of one of the electrodes on the second surface.

In yet another aspect, example embodiments may provide for: (a) means for receiving a first signal at a computing device that is indicative of touch input on a touchpad having a first surface, where at least one electrode is coupled to at least one location on the first surface and where at least a portion of the at least one electrode is arranged on a second surface that is adjacent to the first surface so that a touch to the portion of one of the electrodes on the second surface causes the touchpad to output data relating to the corresponding location on the first surface, (b) means for detecting, in the first signal, data relating to the corresponding location on the first surface; and (c) means for outputting a second signal relating to a touch of one of the electrodes on the second surface.

These as well as other aspects, advantages, and alternatives will become apparent to those of ordinary skill in the art by reading the following detailed description, with reference where appropriate to the accompanying drawings.

DETAILED DESCRIPTION

Figure 1A:
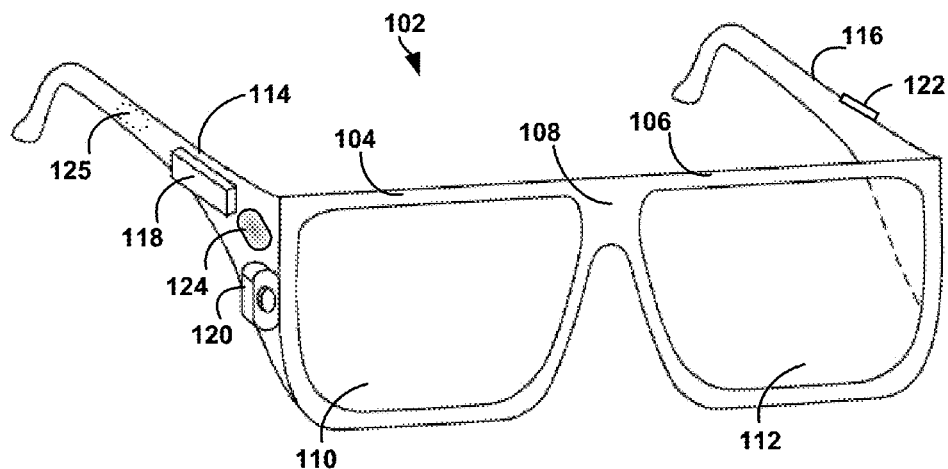
FIG. 1A illustrates a wearable computing system according to an example embodiment.

Example methods and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. In the following detailed description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

I. OVERVIEW

A touchpad (or "trackpad") is a user interface featuring a tactile sensor that can translate the position of a user's fingers to a relative position on a display. Touchpads may be useful in a variety of computing devices, including HMD's (head-mounted displays). Typically, touchpads contain sensing along a single surface on a computing device. In some applications, it would be useful to have an inexpensive way to extend the sensitive area of the touchpad to an adjacent surface.

Example embodiments may provide for one or several electrodes that may be positioned on a surface adjacent to a touchpad. The touchpad may be one of several types of tactile-sensing surfaces that may operate in one of several different ways, such as by using capacitive sensing and/or conductive sensing. The touchpad may detect the X and Y positions of finger touches and report those locations in software. The touchpad may also have a device driver that aggregates raw finger touch data. In an example embodiment, the touchpad and the device driver may be provided by a third party.

The one or more additional electrodes may be capacitively coupled to traces on the touchpad such that a finger touch to one of the electrodes on the adjacent surface is registered as a touch to a particular location on the touchpad. In software, touches to that particular location may then be treated as touches to the electrode on the adjacent surface. Accordingly, the device may operate based on touches to multiple surfaces using a single touchpad.

A small section of the touchpad may be electrically shielded from sensing touches by the one or more additional electrodes. In an example embodiment, the section may be made small enough relative to the size of a typical finger touch that the normal functioning of the touchpad is not disturbed. For example, the touchpad driver may provide smoothing functions and infer the location of a touch using surrounding sensing such that the user experience in operating the touchpad is not disturbed.

A single electrode or multiple electrodes may be added along an adjacent surface located along the top, the bottom, and/or a different side of the touchpad. If multiple electrodes are added, each one may be associated with a different function. The electrodes may be built into a casing or housing that contains the touchpad. To insert the electrodes, conductive material may be added to the housing before assembling it with the touchpad, or all the components may be put together at once.

In an example embodiment, raw finger touch data may initially be sensed by the touchpad. The touchpad driver may process the raw data and output a particular finger touch location. For example, the touchpad driver may average together a range of X and Y positions in order to report a touch as a single (X, Y) position. A control system may then test in software whether the location is a special location corresponding to an electrode that was added to an adjacent surface. If the location is a special location, the touch may be treated as a touch to the electrode on the adjacent surface. Otherwise, the touch may be treated as a normal touchpad touch.

Numerous applications of the example embodiments described above are possible. For instance, a touch to an electrode on the surface adjacent to the touchpad may be treated as a button press. Alternatively, a device may contain a button on a surface opposite the surface containing the electrode and the touch may be used to notify the system that a button press is likely imminent. For example, if the button controls a camera, a touch to the opposite surface containing the electrode may be used as a signal to warm up the camera. Multiple electrodes may also be added to a single device. For example, one electrode positioned opposite a camera button may serve to warm up the camera and a second electrode positioned near the ear may serve to control volume.

It should be understood that the above embodiments and others described herein are provided for purposes of illustration, and are not intended to be limiting. Variations on the above embodiments and other embodiments are possible, without departing from the scope of the invention as set forth by the claims.

II. EXAMPLE WEARABLE COMPUTING DEVICES

Systems and devices in which example embodiments may be implemented will now be described in greater detail. In general, an example system may be implemented in or may take the form of a wearable computer (also referred to as a wearable computing device). In an example embodiment, a wearable computer takes the form of or includes a head-mountable device (HMD).

An example system may also be implemented in or take the form of other devices, such as a mobile phone, among other possibilities. Further, an example system may take the form of non-transitory computer readable medium, which has program instructions stored thereon that are executable by at a processor to provide the functionality described herein. An example system may also take the form of a device such as a wearable computer or mobile phone, or a subsystem of such a device, which includes such a non-transitory computer readable medium having such program instructions stored thereon.

An HMD may generally be any display device that is capable of being worn on the head and places a display in front of one or both eyes of the wearer. An HMD may take various forms such as a helmet or eyeglasses. As such, references to "eyeglasses" or a "glasses-style" HMD should be understood to refer to an HMD that has a glasses-like frame so that it can be worn on the head. Further, example embodiments may be implemented by or in association with an HMD with a single display or with two displays, which may be referred to as a "monocular" HMD or a "binocular" HMD, respectively.

FIG. 1A illustrates a wearable computing system according to an example embodiment. In FIG. 1A, the wearable computing system takes the form of a head-mountable device (HMD) 102 (which may also be referred to as a head-mounted display). It should be understood, however, that example systems and devices may take the form of or be implemented within or in association with other types of devices, without departing from the scope of the invention. As illustrated in FIG. 1A, the HMD 102 includes frame elements including lens-frames 104, 106 and a center frame support 108, lens elements 110, 112, and extending side-arms 114, 116. The center frame support 108 and the extending side-arms 114, 116 are configured to secure the HMD 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the HMD 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the HMD 102 to the user. The extending side-arms 114, 116 may further secure the HMD 102 to the user by extending around a rear portion of the user's head. Additionally or alternatively, for example, the HMD 102 may connect to or be affixed within a head-mounted helmet structure. Other configurations for an HMD are also possible.

The HMD 102 may also include an on-board computing system 118, an image capture device 120, a sensor 122, and a finger-operable touch pad 124. The on-board computing system 118 is shown to be positioned on the extending side-arm 114 of the HMD 102; however, the on-board computing system 118 may be provided on other parts of the HMD 102 or may be positioned remote from the HMD 102 (e.g., the on-board computing system 118 could be wire- or wirelessly-connected to the HMD 102). The on-board computing system 118 may include a processor and memory, for example. The on-board computing system 118 may be configured to receive and analyze data from the image capture device 120 and the finger-operable touch pad 124 (and possibly from other sensory devices, user interfaces, or both) and generate images for output by the lens elements 110 and 112.

The image capture device 120 may be, for example, a camera that is configured to capture still images and/or to capture video. In the illustrated configuration, image capture device 120 is positioned on the extending side-arm 114 of the HMD 102; however, the image capture device 120 may be provided on other parts of the HMD 102. The image capture device 120 may be configured to capture images at various resolutions or at different frame rates. Many image capture devices with a small form-factor, such as the cameras used in mobile phones or webcams, for example, may be incorporated into an example of the HMD 102.

Further, although FIG. 1A illustrates one image capture device 120, more image capture device may be used, and each may be configured to capture the same view, or to capture different views. For example, the image capture device 120 may be forward facing to capture at least a portion of the real-world view perceived by the user. This forward facing image captured by the image capture device 120 may then be used to generate an augmented reality where computer generated images appear to interact with or overlay the real-world view perceived by the user.

The sensor 122 is shown on the extending side-arm 116 of the HMD 102; however, the sensor 122 may be positioned on other parts of the HMD 102. For illustrative purposes, only one sensor 122 is shown. However, in an example embodiment, the HMD 102 may include multiple sensors. For example, an HMD 102 may include sensors 102 such as one or more gyroscopes, one or more accelerometers, one or more magnetometers, one or more light sensors, one or more infrared sensors, and/or one or more microphones. Other sensing devices may be included in addition or in the alternative to the sensors that are specifically identified herein.

The finger-operable touch pad 124 is shown on the extending side-arm 114 of the HMD 102. However, the finger-operable touch pad 124 may be positioned on other parts of the HMD 102. Also, more than one finger-operable touch pad may be present on the HMD 102. The finger-operable touch pad 124 may be used by a user to input commands. The finger-operable touch pad 124 may sense at least one of a pressure, position and/or a movement of one or more fingers via capacitive sensing, resistance sensing, or a surface acoustic wave process, among other possibilities. The finger-operable touch pad 124 may be capable of sensing movement of one or more fingers simultaneously, in addition to sensing movement in a direction parallel or planar to the pad surface, in a direction normal to the pad surface, or both, and may also be capable of sensing a level of pressure applied to the touch pad surface. In some embodiments, the finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

In a further aspect, HMD 102 may be configured to receive user input in various ways, in addition or in the alternative to user input received via finger-operable touch pad 124. For example, on-board computing system 118 may implement a speech-to-text process and utilize a syntax that maps certain spoken commands to certain actions. In addition, HMD 102 may include one or more microphones via which a wearer's speech may be captured. Configured as such, HMD 102 may be operable to detect spoken commands and carry out various computing functions that correspond to the spoken commands.

As another example, HMD 102 may interpret certain head-movements as user input. For example, when HMD 102 is worn, HMD 102 may use one or more gyroscopes and/or one or more accelerometers to detect head movement. The HMD 102 may then interpret certain head-movements as being user input, such as nodding, or looking up, down, left, or right. An HMD 102 could also pan or scroll through graphics in a display according to movement. Other types of actions may also be mapped to head movement.

As yet another example, HMD 102 may interpret certain gestures (e.g., by a wearer's hand or hands) as user input. For example, HMD 102 may capture hand movements by analyzing image data from image capture device 120, and initiate actions that are defined as corresponding to certain hand movements.

As a further example, HMD 102 may interpret eye movement as user input. In particular, HMD 102 may include one or more inward-facing image capture devices and/or one or more other inward-facing sensors (not shown) that may be used to track eye movements and/or determine the direction of a wearer's gaze. As such, certain eye movements may be mapped to certain actions. For example, certain actions may be defined as corresponding to movement of the eye in a certain direction, a blink, and/or a wink, among other possibilities.

HMD 102 also includes a speaker 125 for generating audio output. In one example, the speaker could be in the form of a bone conduction speaker, also referred to as a bone conduction transducer (BCT). Speaker 125 may be, for example, a vibration transducer or an electroacoustic transducer that produces sound in response to an electrical audio signal input. The frame of HMD 102 may be designed such that when a user wears HMD 102, the speaker 125 contacts the wearer. Alternatively, speaker 125 may be embedded within the frame of HMD 102 and positioned such that, when the HMD 102 is worn, speaker 125 vibrates a portion of the frame that contacts the wearer. In either case, HMD 102 may be configured to send an audio signal to speaker 125, so that vibration of the speaker may be directly or indirectly transferred to the bone structure of the wearer. When the vibrations travel through the bone structure to the bones in the middle ear of the wearer, the wearer can interpret the vibrations provided by BCT 125 as sounds.

Various types of bone-conduction transducers (BCTs) may be implemented, depending upon the particular implementation. Generally, any component that is arranged to vibrate the HMD 102 may be incorporated as a vibration transducer. Yet further it should be understood that an HMD 102 may include a single speaker 125 or multiple speakers. In addition, the location(s) of speaker(s) on the HMD may vary, depending upon the implementation. For example, a speaker may be located proximate to a wearer's temple (as shown), behind the wearer's ear, proximate to the wearer's nose, and/or at any other location where the speaker 125 can vibrate the wearer's bone structure.

Figure 1B:
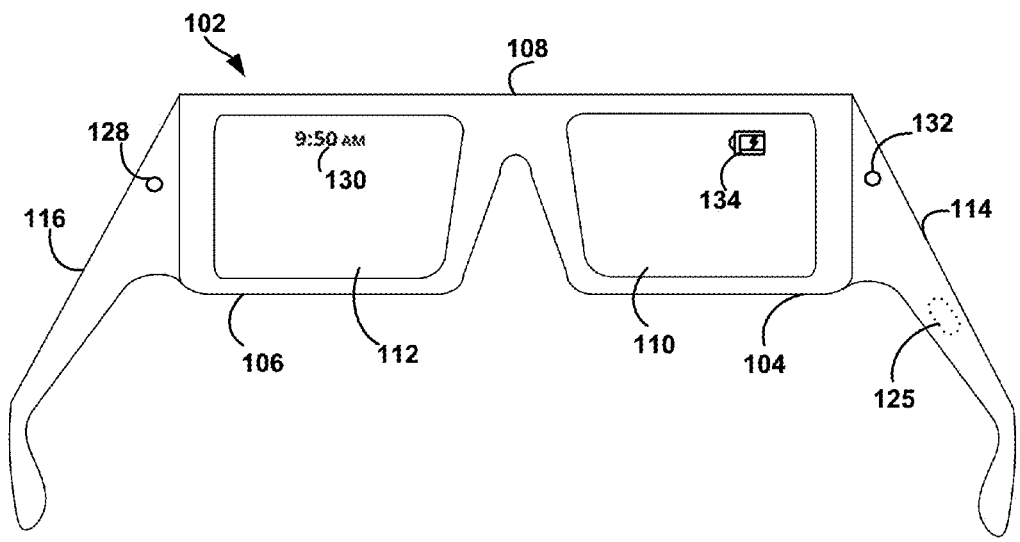
FIG. 1B illustrates an alternate view of the wearable computing device illustrated in FIG. 1A.

FIG. 1B illustrates an alternate view of the wearable computing device illustrated in FIG. 1A. As shown in FIG. 1B, the lens elements 110, 112 may act as display elements. The HMD 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Figure 1C:
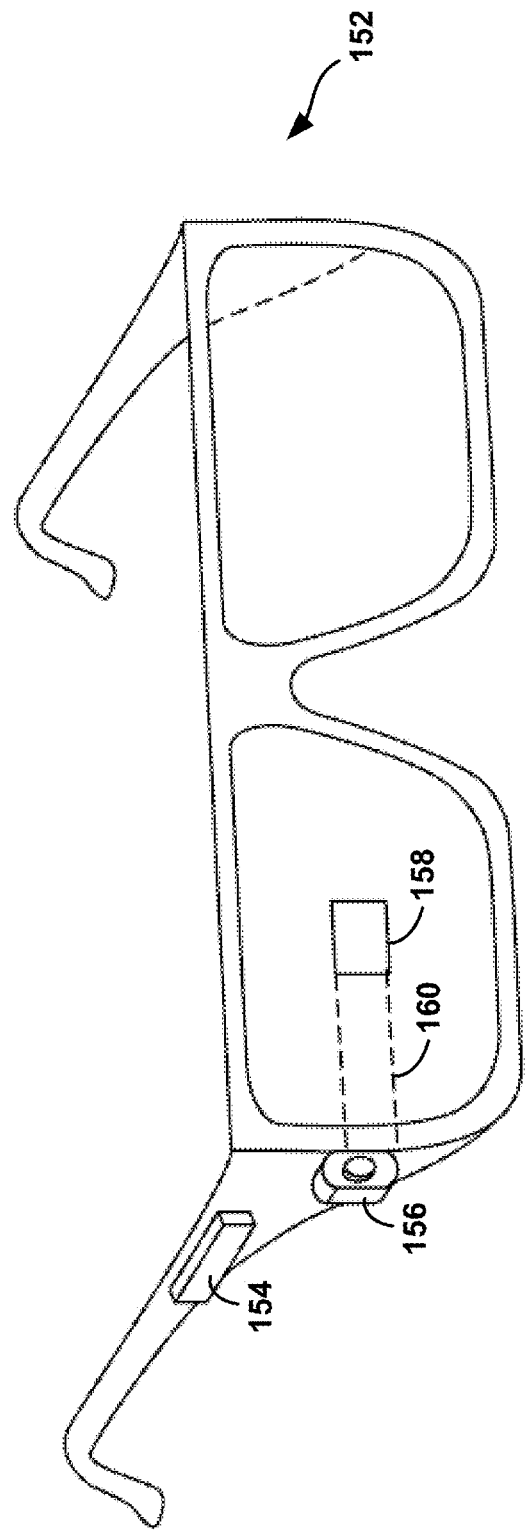
FIG. 1C illustrates another wearable computing system according to an example embodiment.

FIG. 1C illustrates another wearable computing system according to an example embodiment, which takes the form of an HMD 152. The HMD 152 may include frame elements and side-arms such as those described with respect to FIGS. 1A and 1B. The HMD 152 may additionally include an on-board computing system 154 and an image capture device 156, such as those described with respect to FIGS. 1A and 1B. The image capture device 156 is shown mounted on a frame of the HMD 152. However, the image capture device 156 may be mounted at other positions as well.

As shown in FIG. 1C, the HMD 152 may include a single display 158 which may be coupled to the device. The display 158 may be formed on one of the lens elements of the HMD 152, such as a lens element described with respect to FIGS. 1A and 1B, and may be configured to overlay computer-generated graphics in the user's view of the physical world. The display 158 is shown to be provided in a center of a lens of the HMD 152, however, the display 158 may be provided in other positions, such as for example towards either the upper or lower portions of the wearer's field of view. The display 158 is controllable via the computing system 154 that is coupled to the display 158 via an optical waveguide 160.

Figure 1D:
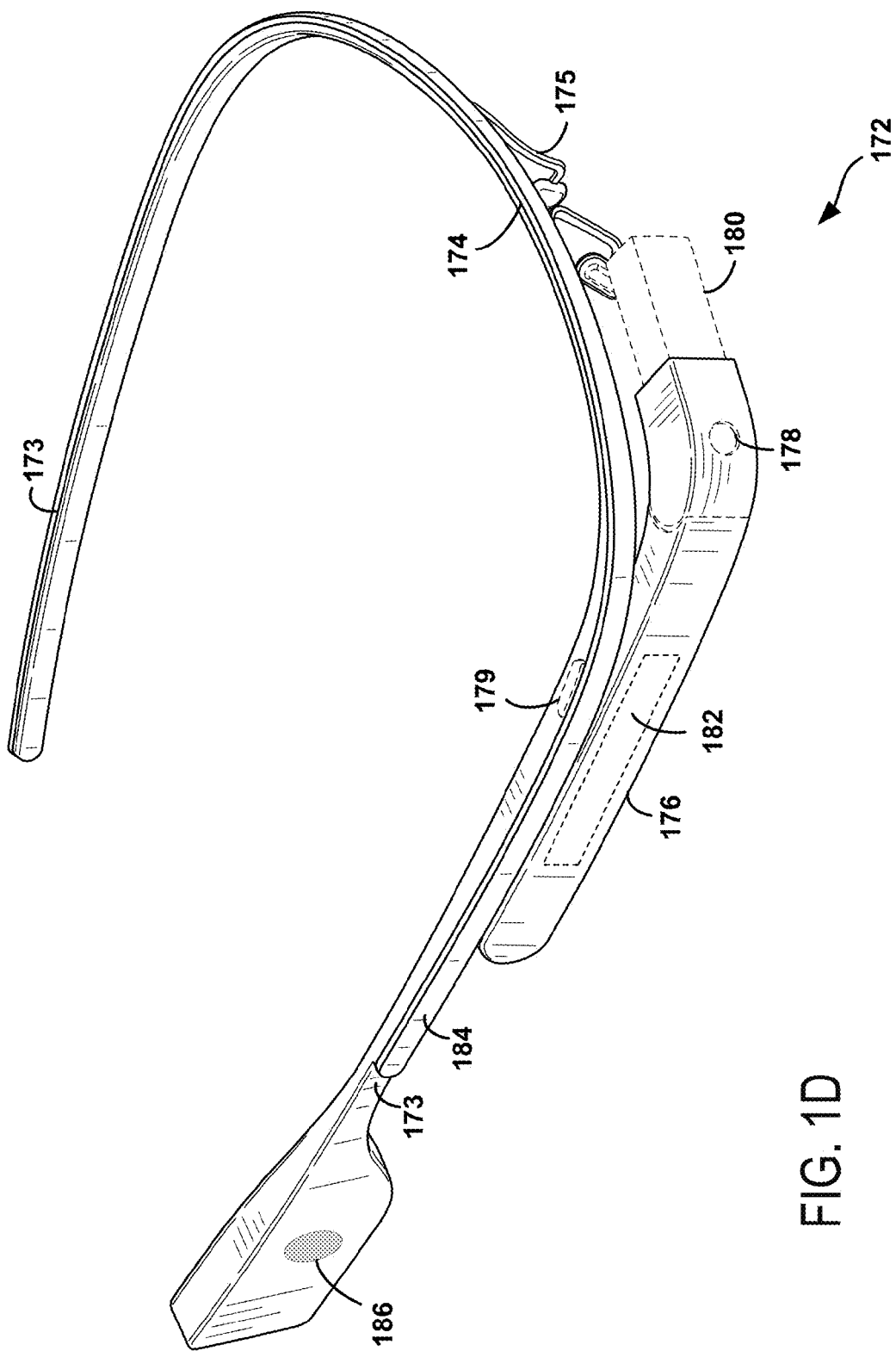
FIG. 1D illustrates another wearable computing system according to an example embodiment.

FIG. 1D illustrates another wearable computing system according to an example embodiment, which takes the form of a monocular HMD 172. The HMD 172 may include side-arms 173, a center frame support 174, and a bridge portion with nosepiece 175. In the example shown in FIG. 1D, the center frame support 174 connects the side-arms 173. The HMD 172 does not include lens-frames containing lens elements. The HMD 172 may additionally include a component housing 176, which may include an on-board computing system (not shown), an image capture device 178, and a button 179 for operating the image capture device 178 (and/or usable for other purposes). Component housing 176 may also include other electrical components and/or may be electrically connected to electrical components at other locations within or on the HMD. HMD 172 also includes a BCT 186.

The HMD 172 may include a single display 180, which may be coupled to one of the side-arms 173 via the component housing 176. In an example embodiment, the display 180 may be a see-through display, which is made of glass and/or another transparent or translucent material, such that the wearer can see their environment through the display 180. Further, the component housing 176 may include the light sources (not shown) for the display 180 and/or optical elements (not shown) to direct light from the light sources to the display 180. As such, display 180 may include optical features that direct light that is generated by such light sources towards the wearer's eye, when HMD 172 is being worn.

In a further aspect, HMD 172 may include a sliding feature 184, which may be used to adjust the length of the side-arms 173. Thus, sliding feature 184 may be used to adjust the fit of HMD 172. Further, an HMD may include other features that allow a wearer to adjust the fit of the HMD, without departing from the scope of the invention.

Figure 1E:
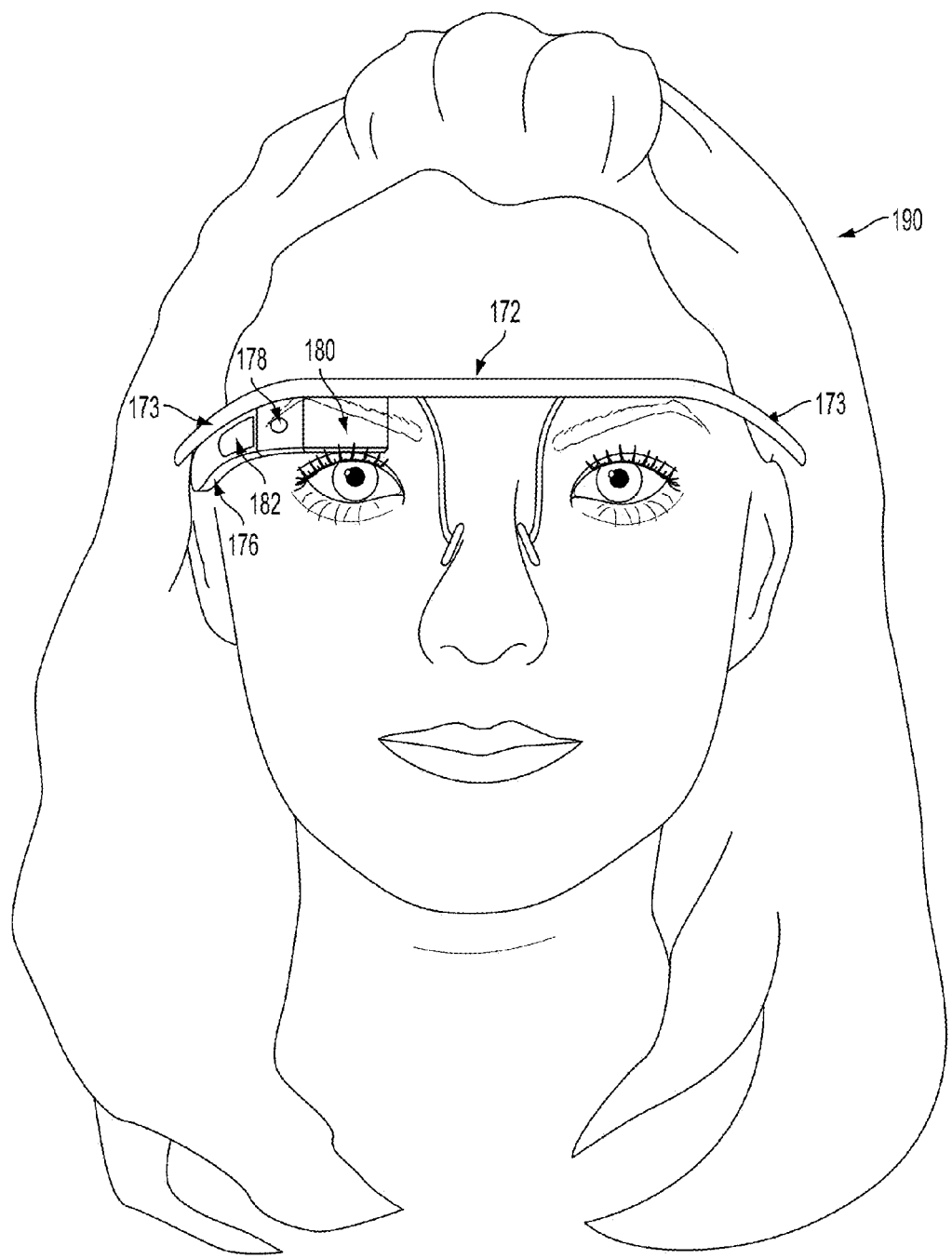
FIGS. 1E to 1G are simplified illustrations of the wearable computing system shown in FIG. 1D, being worn by a wearer.
Figure 1F:
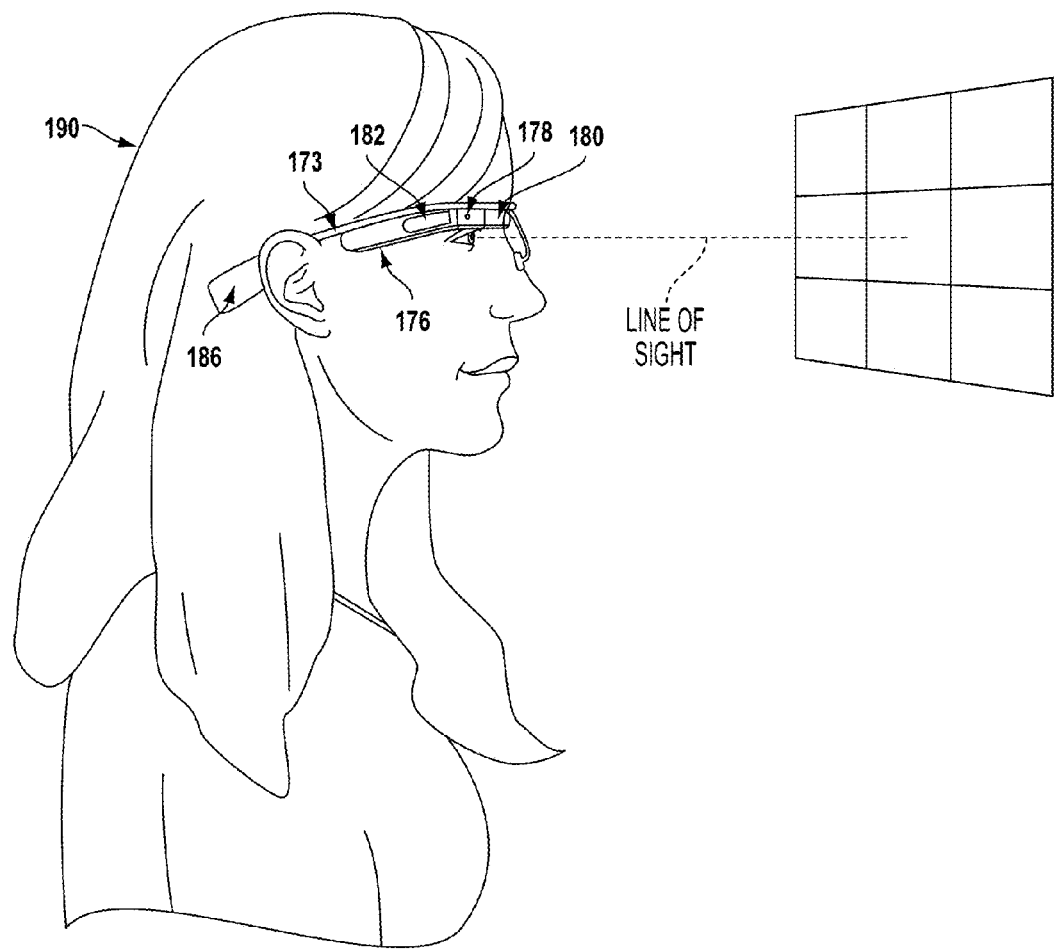
Figure 1G:
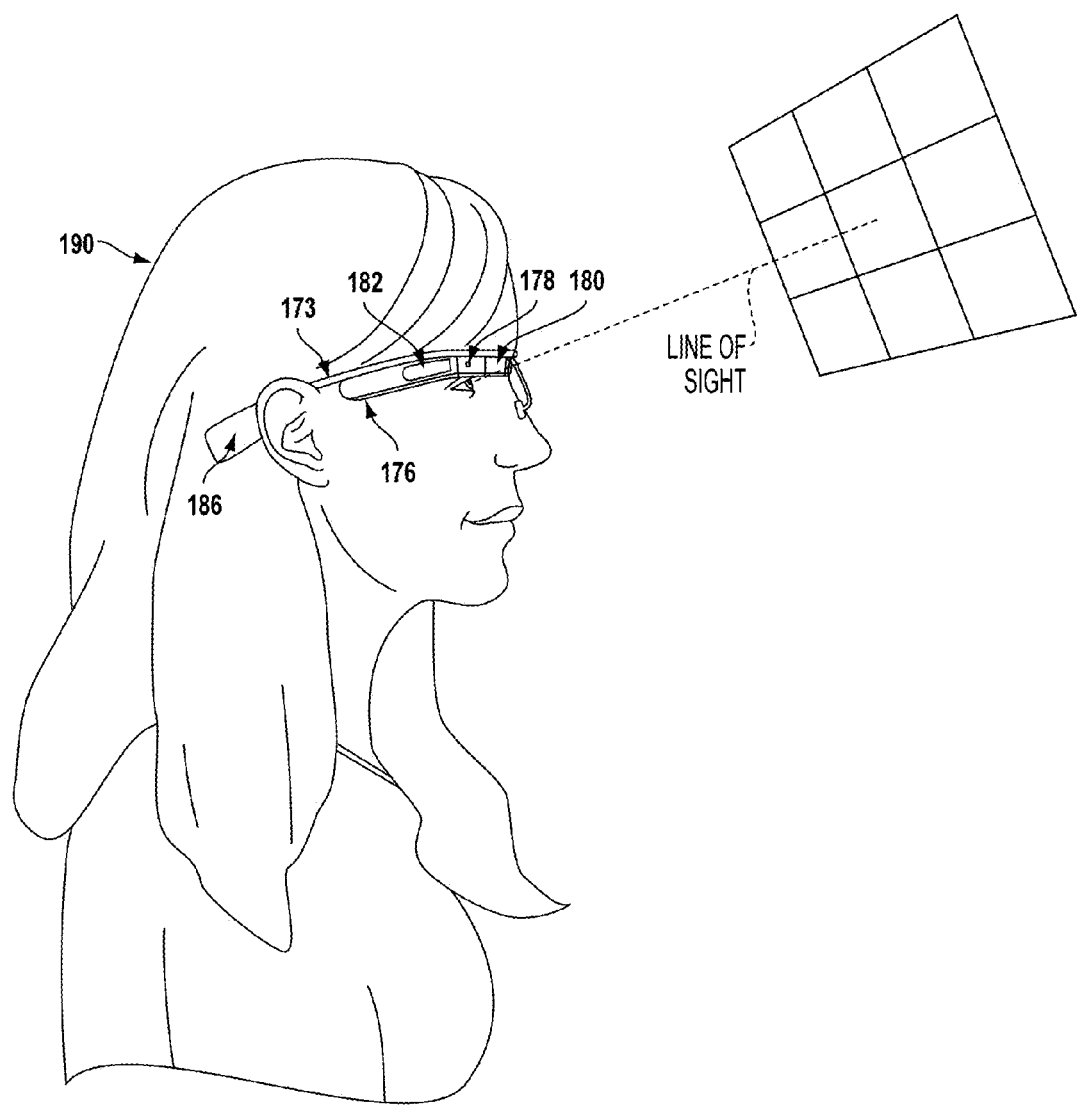

FIGS. 1E to 1G are simplified illustrations of the HMD 172 shown in FIG. 1D, being worn by a wearer 190. As shown in FIG. 1F, when HMD 172 is worn, BCT 186 is arranged such that when HMD 172 is worn, BCT 186 is located behind the wearer's ear. As such, BCT 186 is not visible from the perspective shown in FIG. 1E.

In the illustrated example, the display 180 may be arranged such that when HMD 172 is worn, display 180 is positioned in front of or proximate to a user's eye when the HMD 172 is worn by a user. For example, display 180 may be positioned below the center frame support and above the center of the wearer's eye, as shown in FIG. 1E. Further, in the illustrated configuration, display 180 may be offset from the center of the wearer's eye (e.g., so that the center of display 180 is positioned to the right and above of the center of the wearer's eye, from the wearer's perspective).

Configured as shown in FIGS. 1E to 1G, display 180 may be located in the periphery of the field of view of the wearer 190, when HMD 172 is worn. Thus, as shown by FIG. 1F, when the wearer 190 looks forward, the wearer 190 may see the display 180 with their peripheral vision. As a result, display 180 may be outside the central portion of the wearer's field of view when their eye is facing forward, as it commonly is for many day-to-day activities. Such positioning can facilitate unobstructed eye-to-eye conversations with others, as well as generally providing unobstructed viewing and perception of the world within the central portion of the wearer's field of view. Further, when the display 180 is located as shown, the wearer 190 may view the display 180 by, e.g., looking up with their eyes only (possibly without moving their head). This is illustrated as shown in FIG. 1G, where the wearer has moved their eyes to look up and align their line of sight with display 180. A wearer might also use the display by tilting their head down and aligning their eye with the display 180.

Figure 2:
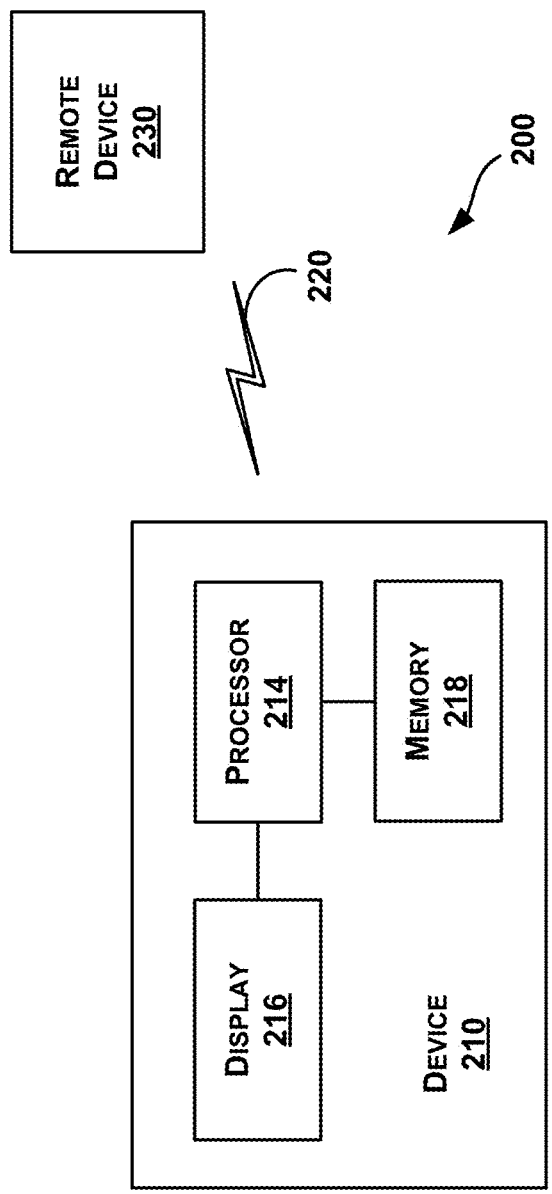
FIG. 2 is a simplified block diagram of a computing device according to an example embodiment.

FIG. 2 is a simplified block diagram a computing device 210 according to an example embodiment. In an example embodiment, device 210 communicates using a communication link 220 (e.g., a wired or wireless connection) to a remote device 230. The device 210 may be any type of device that can receive data and display information corresponding to or associated with the data. For example, the device 210 may be a heads-up display system, such as the head-mounted devices 102, 152, or 172 described with reference to FIGS. 1A to 1G.

Thus, the device 210 may include a display system 212 comprising a processor 214 and a display 216. The display 210 may be, for example, an optical see-through display, an optical see-around display, or a video see-through display. The processor 214 may receive data from the remote device 230, and configure the data for display on the display 216. The processor 214 may be any type of processor, such as a micro-processor or a digital signal processor, for example.

The device 210 may further include on-board data storage, such as memory 218 coupled to the processor 214. The memory 218 may store software that can be accessed and executed by the processor 214, for example.

The remote device 230 may be any type of computing device or transmitter including a laptop computer, a mobile telephone, or tablet computing device, etc., that is configured to transmit data to the device 210. The remote device 230 and the device 210 may contain hardware to enable the communication link 220, such as processors, transmitters, receivers, antennas, etc.

Further, remote device 230 may take the form of or be implemented in a computing system that is in communication with and configured to perform functions on behalf of client device, such as computing device 210. Such a remote device 230 may receive data from another computing device 210 (e.g., an HMD 102, 152, or 172 or a mobile phone), perform certain processing functions on behalf of the device 210, and then send the resulting data back to device 210. This functionality may be referred to as "cloud" computing.

In FIG. 2, the communication link 220 is illustrated as a wireless connection; however, wired connections may also be used. For example, the communication link 220 may be a wired serial bus such as a universal serial bus or a parallel bus. A wired connection may be a proprietary connection as well. The communication link 220 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 230 may be accessible via the Internet and may include a computing cluster associated with a particular web service (e.g., social-networking, photo sharing, address book, etc.).

II. EXAMPLE HARDWARE CONFIGURATIONS

Figure 3:
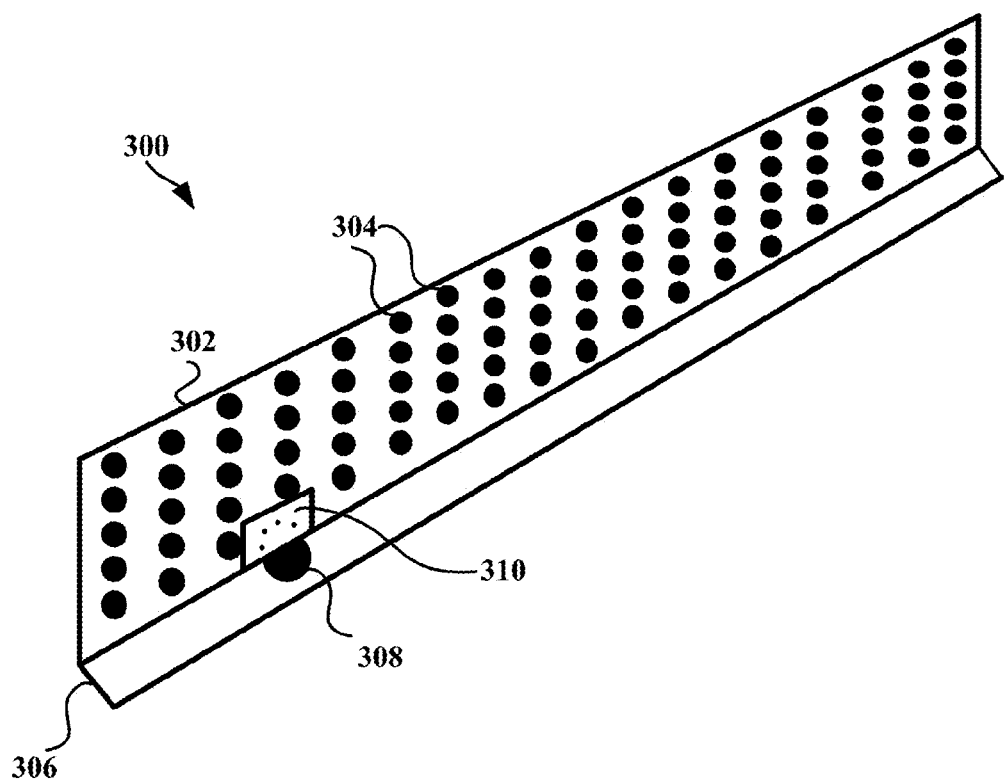
FIG. 3 illustrates an example touchpad and a single electrode, according to an example embodiment.

FIG. 3 illustrates an example user interface containing a touchpad and a single electrode, according to an example embodiment. As shown in the figure, a user interface may contain a touchpad 302 for sensing finger touches. The touchpad may contain a series of conductors 304, such as electrodes, that are arranged in an array of parallel lines in two layers, separated by an insulator and crossing each other at right angles to form a grid. A high frequency signal may be applied sequentially between pairs in this two-dimensional grid array. The current that passes between the nodes may be proportional to the capacitance. When a virtual ground, such as a finger, is placed over one of the intersections between the conductive layer some of the electrical field may be shunted to this ground point, resulting in a change in the apparent capacitance at that location. Accordingly, the location of a finger touch on the touchpad may be reported in software. The touchpad may be directly reachable by a finger touch or it may be below a capacitive surface through which the touch can be detected. Other touchpad configurations relying on capacitive sensing and/or conductive sensing may also be used.

The user interface may contain a second surface 306 that is adjacent to the touchpad 302. For example, the second surface 306 may be located along the top of the touchpad 302 and/or along the bottom of the touchpad 302. The second surface 306 may be connected to the touchpad 302 at a right angle or at a different angle. It should be noted that the relative dimensions of the touchpad 302 and the second surface 306 as shown in FIG. 3 are merely for illustrative purposes. Alternative dimensions of the touchpad 302 and the second surface 306 are also possible.

An electrode 308 may be positioned along the second surface 306 so that a portion of the electrode 308 overlaps the touchpad 302. Accordingly, a certain section 310 of the touchpad 302 may be electrically shielded by the electrode 308. Further, the electrode 308 may be capacitively coupled to the touchpad 302 at the section 310 so that touches to the electrode 308 on the second surface 306 may be registered as touches to the section 310 of the touchpad 302. The electrode 308 may be electrically insulated from the touchpad 302. Alternatively, the electrode 308 may be electrically coupled to the touchpad 302 at the section 310.

The size and location of the electrode 308 may be chosen so as to not disrupt the normal functioning of the touchpad 302. A trial and error approach may be used to determine the appropriate size of the electrode 308 for a given touchpad. For example, if it is determined that the electrode 308 is generating too small a signal to be read by the touchpad 302 when the electrode 308 is touched on the second surface 306, a larger electrode may be used. Further, if it is determined that the electrode 308 is causing too much noise and disrupting the normal functioning of the touchpad 302 (for example, by shielding too large a section 310 of the touchpad 302), a smaller electrode may be used. Additionally, the size of the electrode 308 may be chosen so that the signal generated by a touch to the electrode 308 on the second surface 306 is roughly equivalent to the signal generated by a normal finger touch to the touchpad 302.

The location of the electrode 308 may similarly be determined. For example, if it is determined that the electrode 308 is generating too small a signal to be read by the touchpad 302 when the electrode 308 is touched on the second surface 306, the electrode 308 may be repositioned to overlap a larger portion of the touchpad 302. Further, if it is determined that the electrode 308 is causing too much noise and disrupting the normal functioning of the touchpad 302 (for example, by shielding too large a section 310 of the touchpad 302), the electrode 308 may be repositioned to overlap a smaller portion of the touchpad 302. In an example embodiment, the electrode 308 may be positioned so that it lines up with a single column of conductors in the touchpad 302. This arrangement may minimize the amount of noise caused in the normal touchpad functioning. Other arrangements are also possible.

The electrode 308 may be inserted along the second surface 306 of the user interface in a number of possible different ways. In one example, conductive material may be inserted into a casing or housing that will contain the touchpad 302. For instance, die cut foil may be laminated along an inside surface of the touchpad casing. Alternatively, the conductive material could be added to an inside surface of the housing using selective plating with a laser. In either case, the material may be added inside of the touchpad housing before the housing gets assembled with the touchpad 302. All of the components could be assembled together at the same time as well.

In additional examples, the conductive material making up the electrode 308 may be inserted on the outside surface of the touchpad housing. Alternatively, the conductive material may be layered, with one layer along the outside of the housing and an additional layer along the inside of the housing. Further, the electrode 308 may be directly reachable by a finger touch or it may be below a capacitive surface through which the touch can be detected. Other possibilities for inserting an electrode along a second surface of the user interface exist as well, depending on the desired interface and level of precision.

In a further embodiment, the section 310 of the touchpad may cover an area on the touchpad 302 that is approximately equal to the area covered by a finger touch. Accordingly, the normal functioning of the touchpad 302 may not be disturbed by the shielded area 310 caused by the added electrode 308. The touchpad 302 may be able to determine touches to the area by inferring the location from surrounding sensors that are not shielded. For example, the touchpad 302 may average the signals from around the edge of the shielded area 310 to appropriately determine finger touches to the touchpad 302, even if the touches cover the shielded area 310. By keeping the section 310 of the touchpad 302 approximately equal to the area covered by a finger touch, the touchpad device driver may have enough data to accurately infer touch location, even over the shielded area 310.

Figure 4:
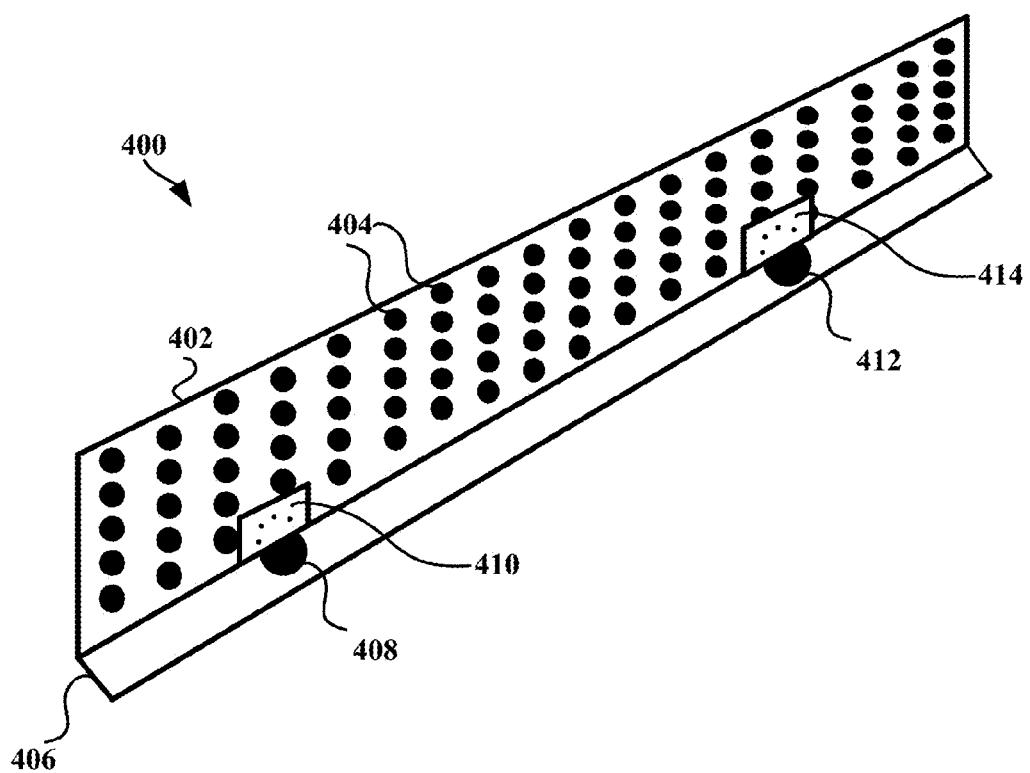
FIG. 4 illustrates an example touchpad and two electrodes, according to an example embodiment.

In an additional embodiment, more than one electrode may be added along the second surface. FIG. 4 illustrates an example user interface containing a touchpad and two electrodes. As shown in the figure, a user interface may contain a touchpad 402 for sensing finger touches. The touchpad 402 may contain a series of conductors 404, such as electrodes. A first electrode 408 may be positioned along a second surface 406 of the user interface so that a portion of the electrode 408 overlaps the touchpad 402. Accordingly, a certain section 410 of the touchpad 402 may be electrically shielded by the first electrode 408. Further, the electrode 408 may be capacitively coupled to the touchpad at the section 410 so that touches to the electrode 408 on the second surface 406 may be registered as touches to the section 410 of the touchpad 402.

A second electrode 412 may be positioned along the second surface 406 at a different location so that a portion of the second electrode 412 overlaps the touchpad 402. Accordingly, a second section 414 of the touchpad 402 may be electrically shielded by the second electrode 412. Further, the second electrode 412 may be capacitively coupled to the touchpad 402 at the second section 414 so that touches to the second electrode 412 on the second surface 406 may be registered as touches to the section 414 of the touchpad.

Accordingly, touches to the first electrode 408 on the second surface 406 may be differentiated from touches to the second electrode 412 on the second surface 406. If the reported touch location corresponds to the first section 410 of the touchpad 402, a touch to the first electrode 408 on the second surface 406 may be identified. Alternately, if the reported touch location corresponds to the second section 414 of the touchpad 402, a touch to the second electrode 412 on the second surface 406 may be identified. Additional electrodes may be added along the second surface 406 in a similar manner.

III. EXAMPLE METHODS

Figure 5:
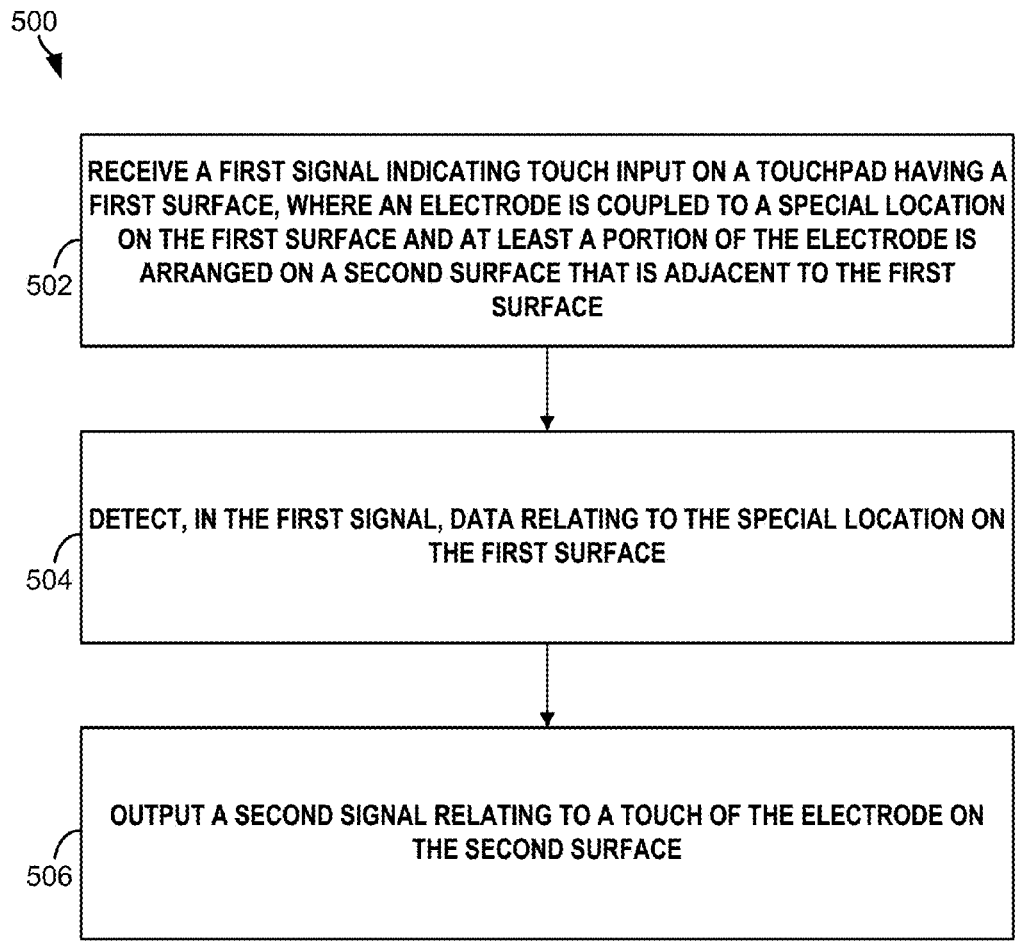
FIG. 5 is a flow chart illustrating a method, according to an example embodiment.

FIG. 5 is a flow chart illustrating a method 500, according to an example embodiment. Illustrative methods, such as method 500, may be carried out in whole or in part by an HMD, such as the head-mountable devices shown in FIGS. 1A to 1G. Method 500 may be carried out by components of an HMD, such as a control system. Such a control system may include, for example, a processor and program instructions stored on a non-transitory computer-readable medium. However, an HMD's control system may additionally or alternatively include other components. Further, an example method or portions thereof may be carried out by components of an HMD other than a control system. Yet further, an example method, or portions thereof, may be carried out by a computing device that is in communication with an HMD. An example method may also be carried out by other types of computing devices and/or combinations of computing devices, without departing from the scope of the invention. Other examples of such computing devices include, but are not limited to, other types of wearable computing devices, mobile phones, and tablet computers.

As shown by block 502, method 500 may involve an HMD receiving a first signal indicating touch input on a touchpad having a first surface, where an electrode is coupled to a special location on the first surface and at least a portion of the electrode is arranged on a second surface that is adjacent to the first surface. The HMD may detect, in the first signal, data relating to the special location on the first surface, as shown by block 504. The HMD may then output a second signal relating to a touch of the electrode on the second surface, as shown by block 506.

The step 502 of receiving a first signal indicating touch input on a touchpad may involve receiving a single touch location from the touchpad. The touch location could be a single pair of coordinates, corresponding to an X location and a Y location. Alternatively, the touch location could be a range of X and Y locations corresponding to the entire area being touched by a finger touch. In some embodiments, the touchpad may be able to sense multiple touches simultaneously. Accordingly, the first signal may indicate multiple separate touch locations.

The step 504 may involve detecting, in the first signal, data relating to the special location on the touchpad. In software, the HMD may initially receive a finger touch location in step 502. The HMD may then check whether the finger touch location is the special location corresponding to the electrode added to the second surface. For example, it may be determined that a touch to the electrode on the second surface causes the touchpad to identify a finger touch location of (x=15, y=95). In that case, the step 504 may involve the HMD testing whether the touch location received from the touchpad is equal to the location (x=15, y=95).

The step 506 may involve outputting a second signal relating to a touch of the electrode on the second surface. In an example embodiment, the HMD may take a specific action in response to the second signal. Accordingly, the electrode provides the HMD with the ability to sense a touch on the second surface and act accordingly. In an additional embodiment, data relating to the special location from the first signal may be removed and the HMD may then operate based on the first signal. Because a touch location relating to the electrode on the second surface does not indicate that the touchpad has been touched at that location, it may be desirable to prevent the HMD from taking the actions it usually takes in response to touchpad touches. Accordingly, the HMD may only take the actions it would take in response to a touchpad touch when the touch location is not the special location.

Figure 6:
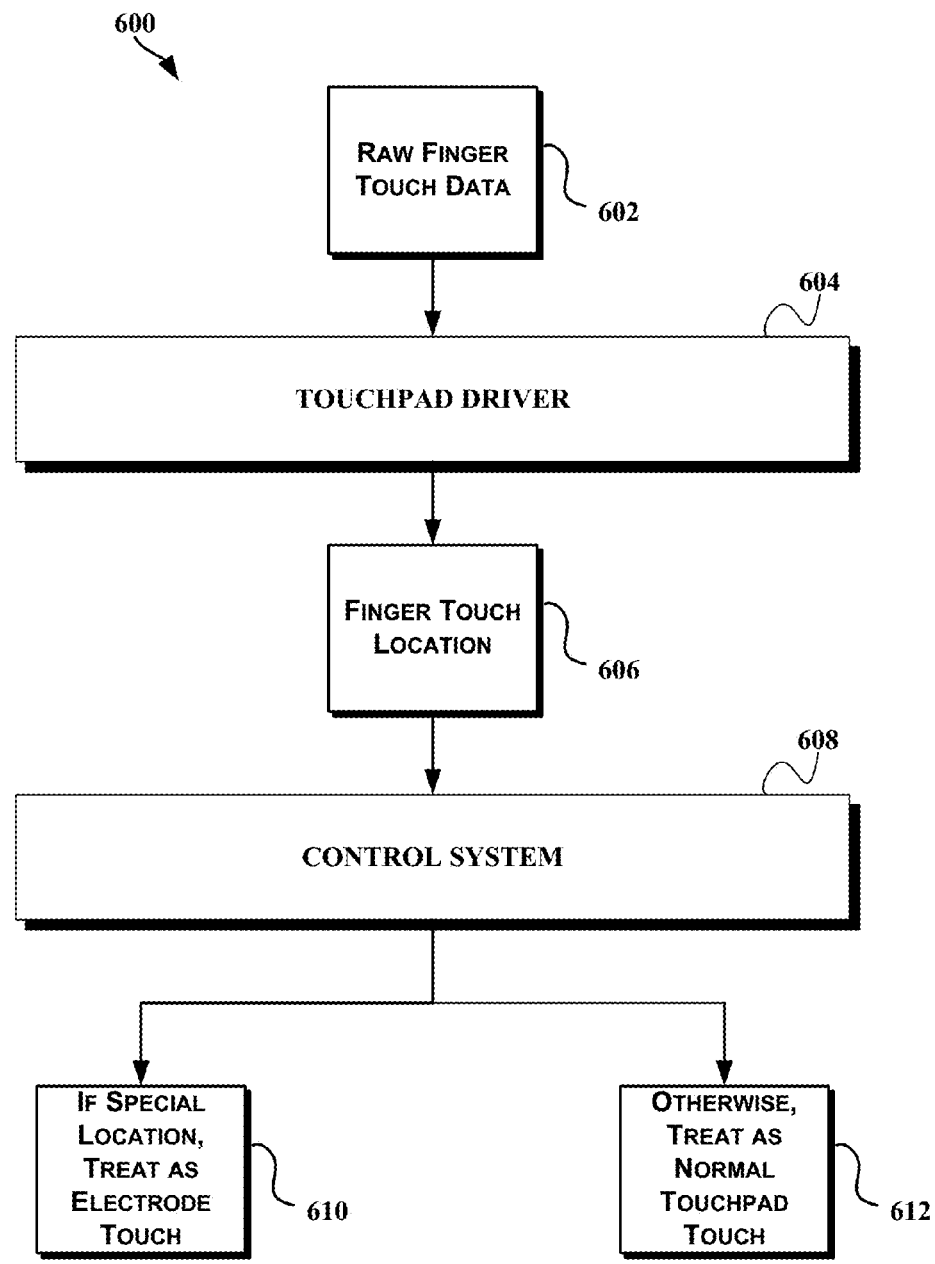
FIG. 6 illustrates a signal flow diagram, according to an example embodiment.

FIG. 6 is a signal flow diagram, according to an example embodiment. FIG. 6 shows one illustrative sequence of how the data flow of the HMD or other device may be structured. It should be understood that the steps shown in FIG. 6 could be carried out by different components than described in this example. Further, the steps may be combined, separated into multiple steps, and/or carried out in a different order than described in this example.

In an example embodiment, raw finger touch data may initially be sensed by the touchpad, as shown at block 602. For example, the raw finger touch data may be in the form of a range of X and Y coordinates covered by a finger touch. For instance, if a finger touches covers the touchpad in the X direction from the coordinates of 82 to 92 and in the Y direction from the coordinates of 80 to 100, the raw finger touch data may consist of the range (x: 82-92, y: 80-100).

At block 604, the touchpad device driver may process the raw finger touch data. The touchpad device driver may provide smoothing functions in order to prevent jitter in the resulting output. For instance, if the touchpad is used to control the location of a pointer on a display, the touchpad driver may extrapolate location by averaging touch signals over time in order to provide a smooth user experience.

The touchpad driver may output one or more particular finger touch locations, as shown in block 606. For instance, the driver may average raw data consisting of a finger touch over the range (x: 82-92, y: 80-100) in order to output the location (x=86, y=90). The output of the device driver may be available to the HMD in software. In some embodiments, the device driver may be provided by a third party and may not need to be modified. In other embodiments, the device driver may be modified to include some or all of the functionality of the control system.

At block 608, a control system may then operate based on the output of the device driver. For instance, the control system may compare the outputted finger touch location to the special locations that correspond to one or more electrodes added to the second surface of the user interface, as described above. For example, the special locations may be the average of the coordinates read as raw finger touch data when one of the electrodes on the second surface is touched. In an example embodiment, these locations may be predetermined and hardcoded into the control system.

At block 610, if the finger touch location corresponds to a special location, it may be determined that a finger touch to one of the electrodes on the second surface of the user interface has occurred. The control system may then cause the HMD to operate based on the touch to the second surface. Alternatively, the control system may send a signal to a different component of the HMD so that the finger touch to the second surface may be processed in the appropriate location. Furthermore, the control system may ensure that the touch is not treated as a touch to the identified location on the touchpad.

If, on the other hand, the finger touch location does not correspond to a special location, the control system may treat the touch location as a normal touchpad touch, as shown in block 612. The control system may cause the HMD to operate based on the touchpad touch. Alternatively, the control system may send a signal to a different component of the HMD so that the finger touch to the touchpad may be processed in the appropriate location.

IV. EXAMPLE APPLICATIONS

Example applications of the hardware and methods identified above will now be described with reference to various example user interfaces. It should be understood, however, that the below applications of the hardware and methods identified above are not intended to be limiting.

In an example embodiment, the area containing the electrode on the second surface of the user interface may act as a virtual button on the device. When a finger touch is detected to the portion of the electrode on the second surface of the user interface, a binary signal may be sent by a control system of the device. A single binary signal may be sent each time the area containing the electrode is touched. Alternatively, the signal may not be sent until a certain period of time has passed. The control system or a different component of the device then may act on the binary signal, depending on the functionality attached to the virtual button.

In a further example embodiment, the touchpad housing may contain physical and/or visual indications that the area on the second surface containing the electrode is serving as a button. For example, the area may be elevated, given a different texture, or otherwise physically modified so that a user may easily find the area with her finger. Additionally, the area may be given a different color or appearance to identify it as a button to users.

Figure 7A:
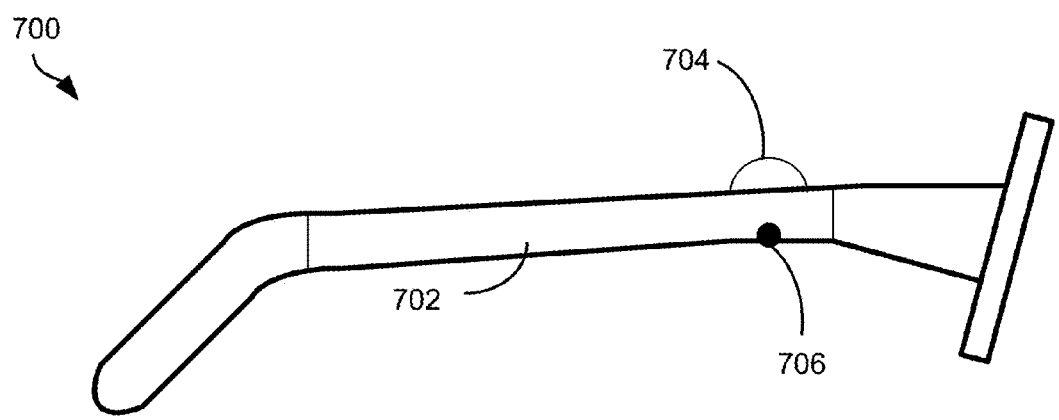
FIG. 7A illustrates a portion of a device containing a touchpad and an electrode, according to an example embodiment.

In an additional example embodiment, the area containing the electrode on the second surface may function to send a continuous signal indicating that the area is being touched. The continuous signal may be sent as long as the area is being touched, and may stop when the area is no longer being touched. In some examples, this continuous signal may cause the device to perform one or more functions in anticipation of a future possible action, such as a button press. FIG. 7A shows a portion of an example HMD containing a touchpad and an electrode on a second surface that may send a signal that a button on the opposite surface may soon be pressed. As shown, the user interface includes a touchpad 702 located on the side of the interface that is used to detect finger touches. The user interface also contains a button 704 located on the adjacent top surface. As shown in this example, the button 704 may be a physical button that is mechanically depressed and released. It could also be a virtual button that detects when the area has been touched, for example by adding an electrode to the top surface and coupling it to the touchpad as described above.

The user interface further contains an electrode 706 located on the bottom surface of the user interface opposite the button 704. The electrode 706 may be coupled to the touchpad 702 in the manner described above. When the area on the bottom surface containing the electrode 706 is touched, a signal may be sent by a control system of the HMD indicating that the button 704 is likely to be pressed in the near future. The control system or a different system of the HMD may then take actions to prepare for a possible impending button press.

Figure 7B:
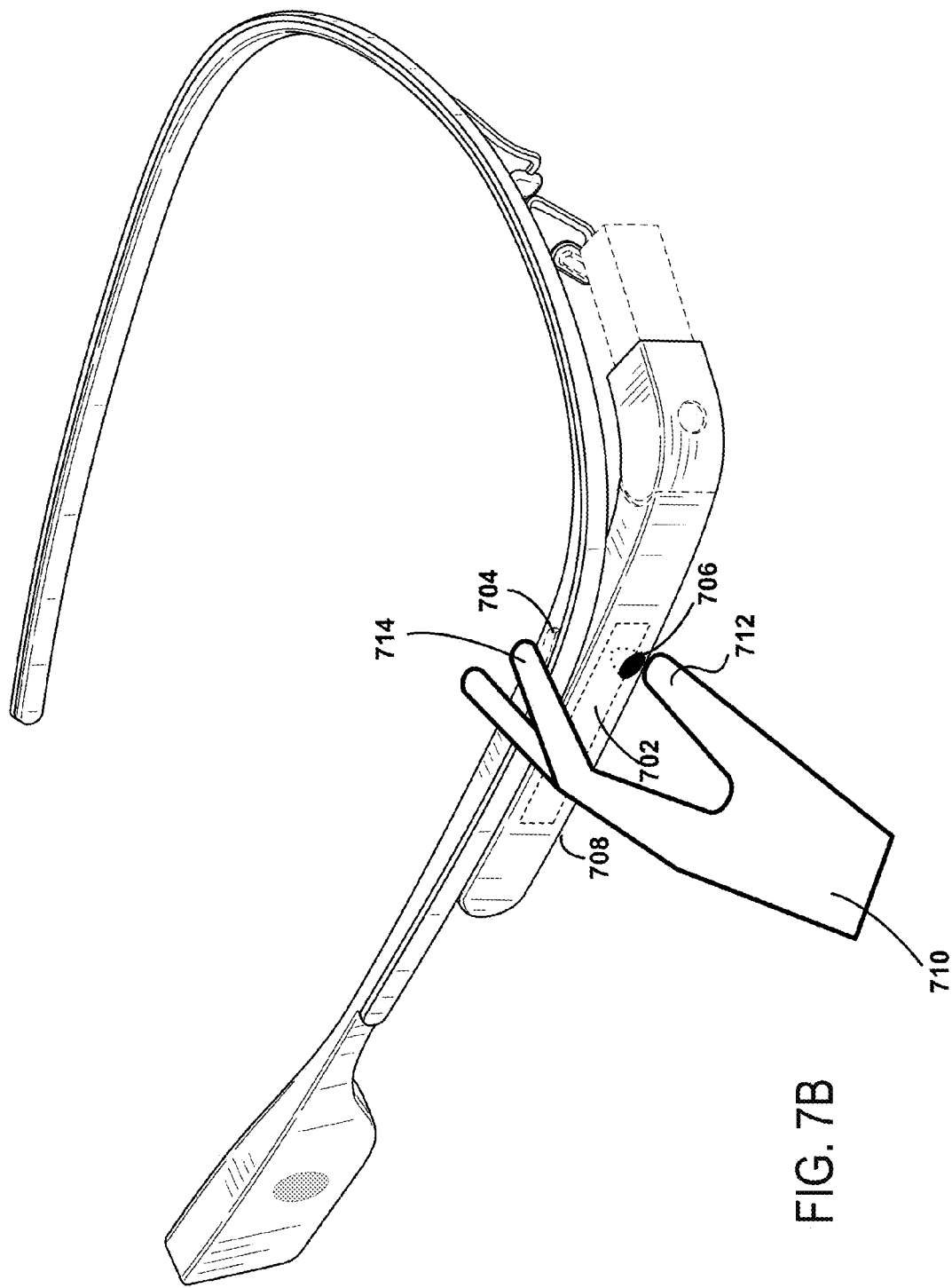
FIG. 7B illustrates the wearable computing system shown in FIG. 1D with an electrode, according to an example embodiment.

FIG. 7B shows the wearable computing system shown in FIG. 1D with an electrode added in a similar manner as shown in the portion of the device in FIG. 7A. As shown in FIG. 7B, an electrode 706 may be added opposite the button 704 such that a portion of the electrode 706 overlaps the touchpad 702. Further, a portion of the electrode 706 may be positioned along the bottom of the housing 708 so that a touch to the bottom of the housing 708 may be registered by the touchpad 702. Accordingly, touches to the bottom of the housing 708 may be used to warm up the device in anticipation of a future press of the button 704.

In FIG. 7B, the electrode 706 is shown positioned opposite the button 704. This configuration allows the user 710 to first place her thumb 712 on the portion of the electrode 706 on the bottom surface of the housing 708 and opposite the button 704. A continuous signal may be sent as long as the user's thumb 712 is in contact with the bottom surface, and the user may keep her thumb 712 in place while pressing the button 704 with another finger 714. This position allows the user to support the HMD with her thumb 712 while pressing the button 704 so that the HMD is stabilized and does not get misaligned by the button press. Alternatively, the electrode 706 may be positioned at a different location on either the bottom surface or the top surface of the interface.

In another example embodiment, the button 704 of FIGS. 7A and 7B may be used to cause a camera of the HMD to take a picture. In such an embodiment, a touch to the electrode 706 on the bottom surface may send a signal that serves as a pre-image-capture signal indicating that a picture may soon be taken. Thus, the HMD may initiate an image-capture preparation process when it detects that one of the wearer's fingers is touching the surface opposite the image-capture button. By doing so, the camera will be ready to capture an image if the user does, in fact, engage the image-capture button.

In a further example embodiment, the image-capture preparation process may involve various functions or combinations of functions. As examples, an image-capture preparation process may involve: (a) powering up a camera sensor, (b) powering up a camera chipset, (c) powering up internal cores of the HMD that run camera driver software, (d) pre-allocating memory buffers for the cameras functions, (e) establishing a connection (e.g., an OMX connection) between a main user-space core (such as that of the HMD's operating system) and the camera controller cores, and/or (f) setting default imaging parameters for the camera. Additionally or alternatively, the image-capture preparation process may involve initiating a camera preview process to acquire a stream of image frames from the camera. These images may then be used to carry out an auto-exposure process, an auto-focus process, and/or an automatic white-balancing process, among other possibilities. Further, such images might be used preview the scene in a viewfinder and/or LCD display.

It should be understood that the touches to the electrode 706 on the bottom surface could send a wide variety of different signals depending on the functionality of the button 704. An electrode 706 on the opposite surface could be used for any button functionality that would benefit from preprocessing steps on the HMD and/or user interface preview processes on a display, among other things.

Figure 8:
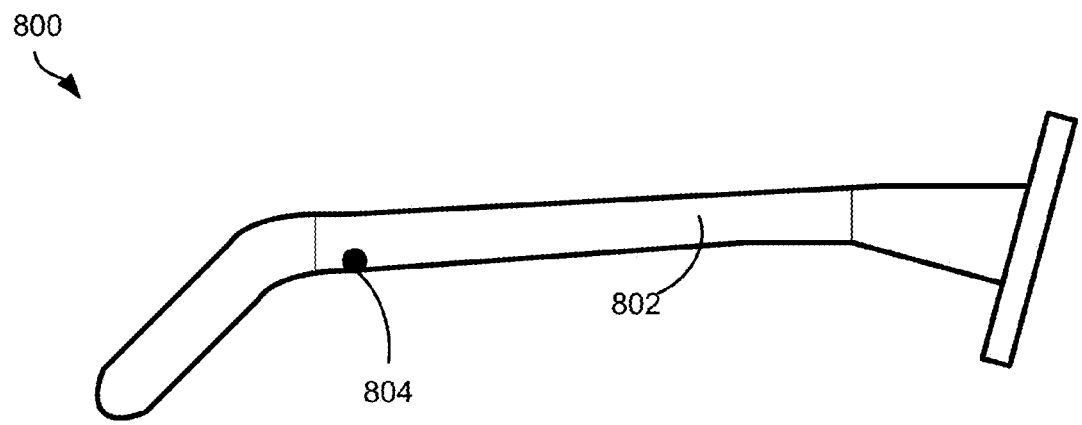
FIG. 8 illustrates a portion of a device containing a touchpad and an electrode at an alternative location, according to an example embodiment.

In an additional example embodiment, an electrode may be positioned near the ear of the user and may serve to control volume. FIG. 8 shows a portion of an example HMD containing a user interface that includes an electrode on a second surface that is used to send a volume-control signal. As shown, the user interface includes a touchpad 802 located on the side of the interface that is used to detect finger touches. The user interface further contains an electrode 804 located on the bottom surface of the user interface near the earpiece of the device. It may be a natural position for a user to control volume. In another example embodiment, the electrode 804 could be located on a top surface or a back surface adjacent to the side surface containing the touchpad 802.

Touches to the electrode 804 on the bottom surface of the user interface could be used to control volume in a number of ways. For instance, the area could effectively function as an on/off switch that would toggle the volume setting of the device between on and mute. Alternatively, a user could control the volume by holding her finger on the electrode 804 on the bottom surface. Touches to the area may cause the volume to continue to increase as long as the user's finger stays in contact with the area, until a maximum volume is reached. At that point, the volume may cycle back to mute. As another alternative, the user may be able to remove her finger and then touch the area again to decrease the volume. Other possibilities exist.

In yet another example embodiment, one or more electrodes may be added on surfaces adjacent to a touchpad near moving parts of the HMD, such as hinges of the device. Specific functionality may be associated with the movement of a moving part of the device, such as powering on or powering off the device, causing the device to go into a sleep mode, or otherwise changing the status of the device. When a user touches an electrode located on an adjacent surface near a moving part, it may be inferred that the moving part may likely be moved in the imminent future. Accordingly, it may be useful to send a signal to cause a control system or different system of the HMD to take preparatory actions or other types of actions based on the likelihood that any functionality associated with the moving part may need to be activated imminently.

VII. CONCLUSION

It should be understood that the examples described with reference to an HMD are not limited to an HMD. It is contemplated that the example methods and systems described with reference to an HMD may be implemented on other types of computing devices, such as other types of wearable devices, mobile phones, tablet computers, and/or laptop computers, for instance.

More generally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A device comprising:
a touchpad having a first surface;
an electrode coupled to a given location on the first surface, wherein the electrode extends from the given location on the first surface onto a second surface that is adjacent to the first surface;
and a control system configured to:
receive signals that are indicative of touch input on the touchpad;
determine that a first received signal indicates a first touch input at a location on the first surface other than the given location on the first surface;
in response to determining that the first received signal indicates the first touch input at the location on the first surface other than the given location on the first surface, operate the device according to the first touch input at the location on the first surface indicated by the first received signal;
determine that a second received signal indicates a second touch input at the given location on the first surface; and
in response to determining that the second received signal indicates the second touch input at the given location on the first surface, refrain from operating the device according to the second touch input at the given location on the first surface indicated by the second received signal and instead operate the device according to a touch input on the second surface.

2. The device of claim 1, wherein the given location comprises an area on the touchpad approximately equal to an area covered by a finger touch.

3. The device of claim 1, wherein the electrode is positioned in line with a column of conductors of the touchpad.

4. The device of claim 1, comprising a head-mountable device (HMD).

5. The device of claim 4, further comprising a button located on a third surface opposite the second surface; and
wherein the control system is further configured to perform one or more functions in anticipation of a press of the button based on the touch input on the second surface.

6. The device of claim 5, wherein the button is a camera button.

7. The device of claim 4, wherein
the electrode comprises an electrode located near an earpiece of the device; and
the control system is further configured to determine a volume setting of the device based on the touch input on the second surface.

8. The device of claim 1, wherein the second surface is connected to the first surface at a right angle.

9. The device of claim 1, wherein the control system is further configured to receive the signals that are indicative of touch input on the touchpad from a device driver of the touchpad.

10. The device of claim 1, wherein the electrode comprises die cut foil laminated along a surface of a housing for the touchpad.

11. The device of claim 1, wherein the electrode is added to a housing for the touchpad using selective plating with a laser.

12. The device of claim 1, wherein the electrode comprises a first layer of conductive material located along an outside surface of a housing for the touchpad and a second layer of conductive material located along an inside surface of the housing for the touchpad.

13. A method comprising:
receiving signals at a computing device that are indicative of touch input on a touchpad having a first surface, wherein an electrode is capacitively coupled to a given location on the first surface and wherein the electrode extends from the given location on the first surface onto a second surface that is adjacent to the first surface;
determining that a first received signal indicates a first touch input at a location on the first surface other than the given location on the first surface;
in response to determining that the first received signal indicates the first touch input at the location on the first surface other than the given location on the first surface, operating the device according to the first touch input at the location on the first surface indicated by the first received signal;
determining that a second received signal indicates a second touch input at the given location on the first surface; and
in response to determining that the second received signal indicates the second touch input at the given location on the first surface, refraining from operating the device according to the second touch input at the given location on the first surface indicated by the second received signal and instead operating the device according to a touch input on the second surface.

14. The method of claim 13, wherein the computing device comprises a head-mountable device (HMD).

15. The method of claim 13, further comprising performing one or more functions in anticipation of a press of a button located on a third surface opposite the second surface.

16. A non-transitory computer readable memory having stored therein instructions executable by a computing device to cause the computing device to perform functions comprising:
- receiving signals that are indicative of touch input on a touchpad having a first surface, wherein an electrode is capactively coupled to a given location on the first surface and wherein the electrode extends from the given location on the first surface onto a second surface that is adjacent to the first surface;
- determining that a first received signal indicates a first touch input at a location on the first surface other than the given location on the first surface;
- in response to determining that the first received signal indicates the first touch input at the location on the first surface other than the given location on the first surface, operating the device according to the first touch input at the location on the first surface indicated by the first received signal;
- determining that a second received signal indicates a second touch input at the given location on the first surface; and
- in response to determining that the second received signal indicates the second touch input at the given location on the first surface, refraining from operating the device according to the second touch input at the given location on the first surface indicated by the second received signal and instead operating the device according to a touch input on the second surface.

17. The non-transitory computer readable memory of claim 16, wherein the computing device comprises a head-mountable device (HMD).

18. The non-transitory computer readable memory of claim 16, wherein the functions further comprise performing one or more functions in anticipation of a press of a button located on a third surface opposite the second surface.

* * * * *